March 24, 1953 G. GERALDSON ET AL 2,632,575
TRACTOR MOUNTED LIFTER AND LOADER
Filed March 23, 1948 3 Sheets-Sheet 1
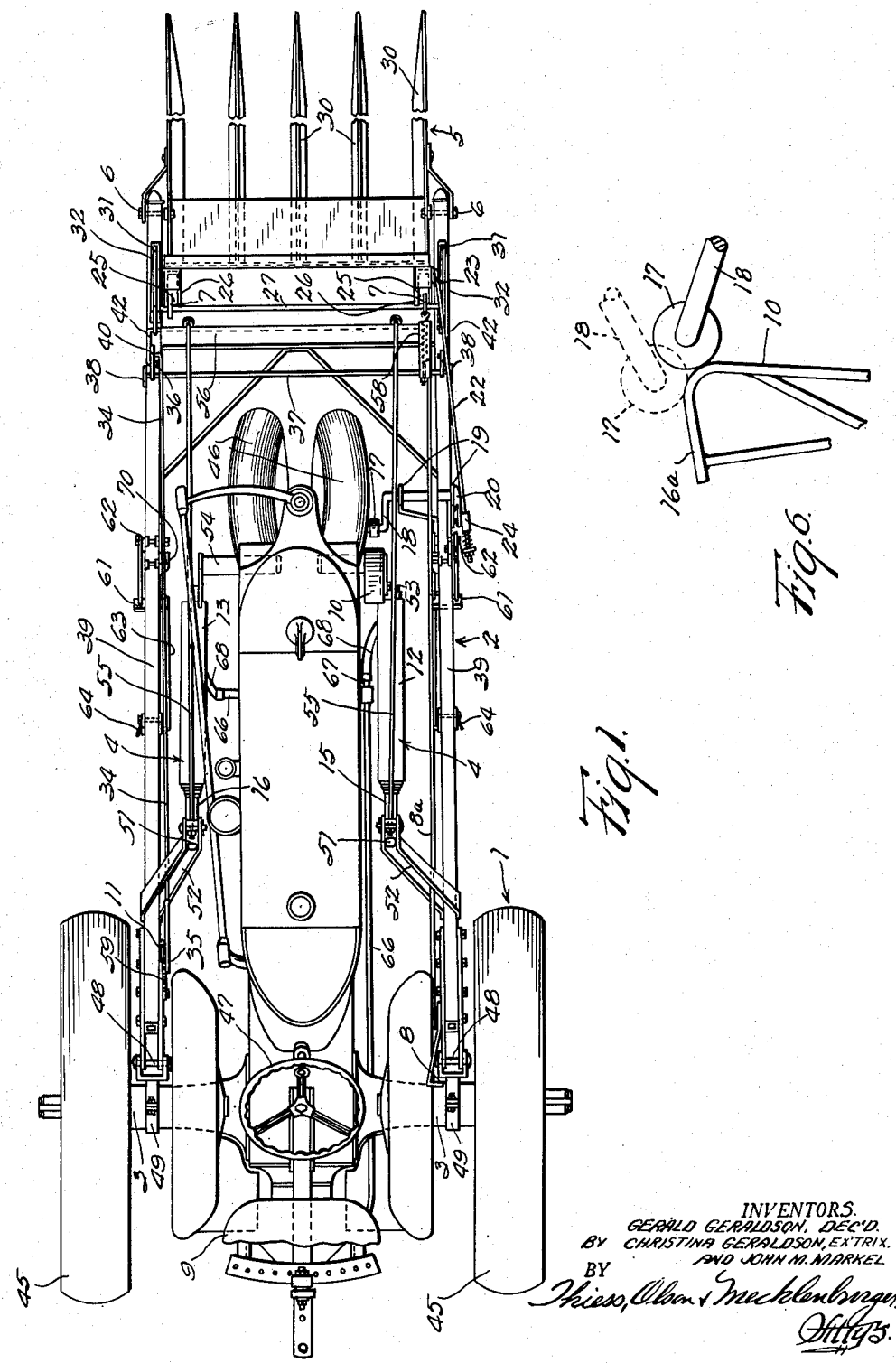
INVENTORS.
GERALD GERALDSON, DEC'D.
BY CHRISTINA GERALDSON, EX'TRIX.
AND JOHN M. MARKEL
BY
Thiess, Olson & Mecklenburger
Attys.

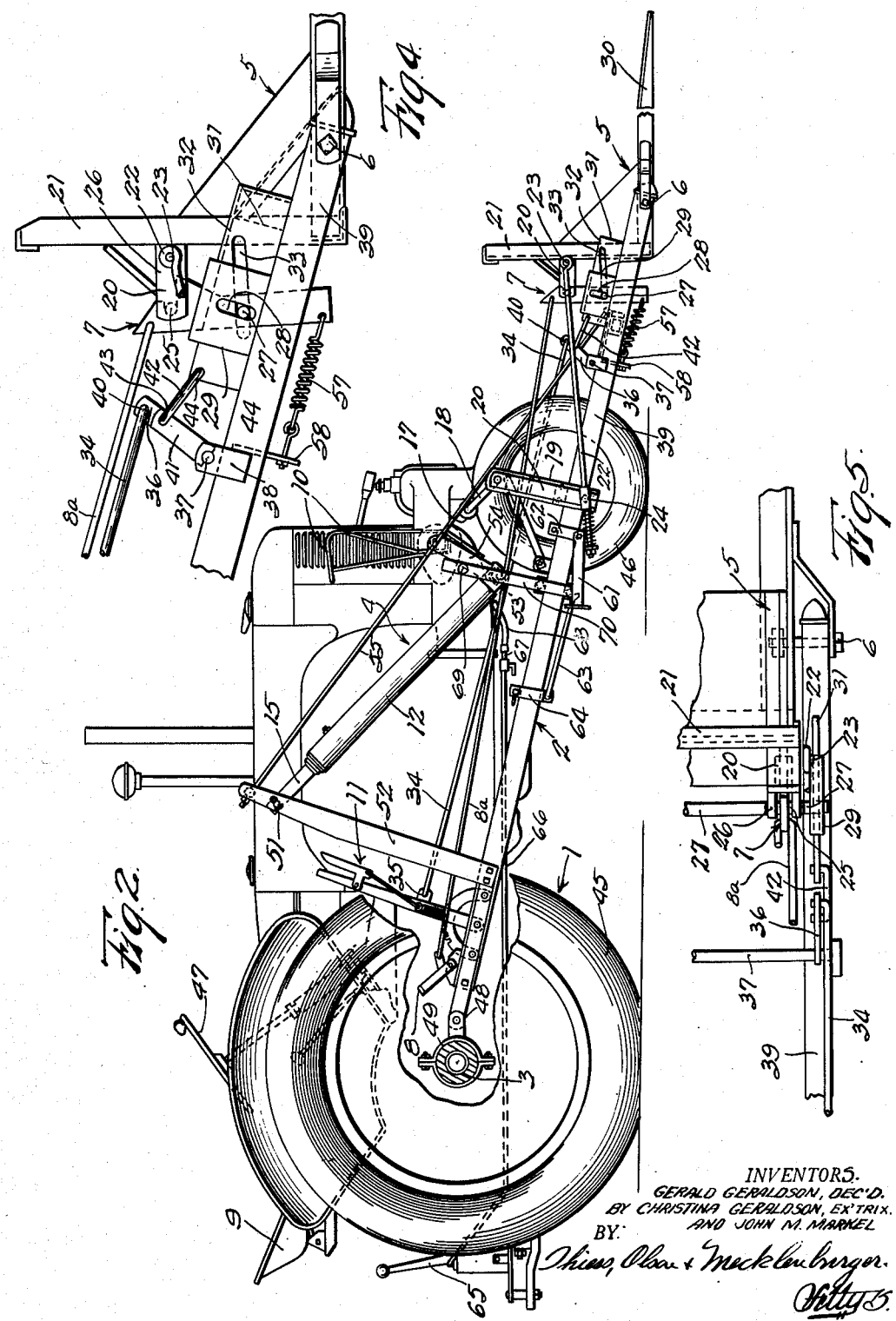

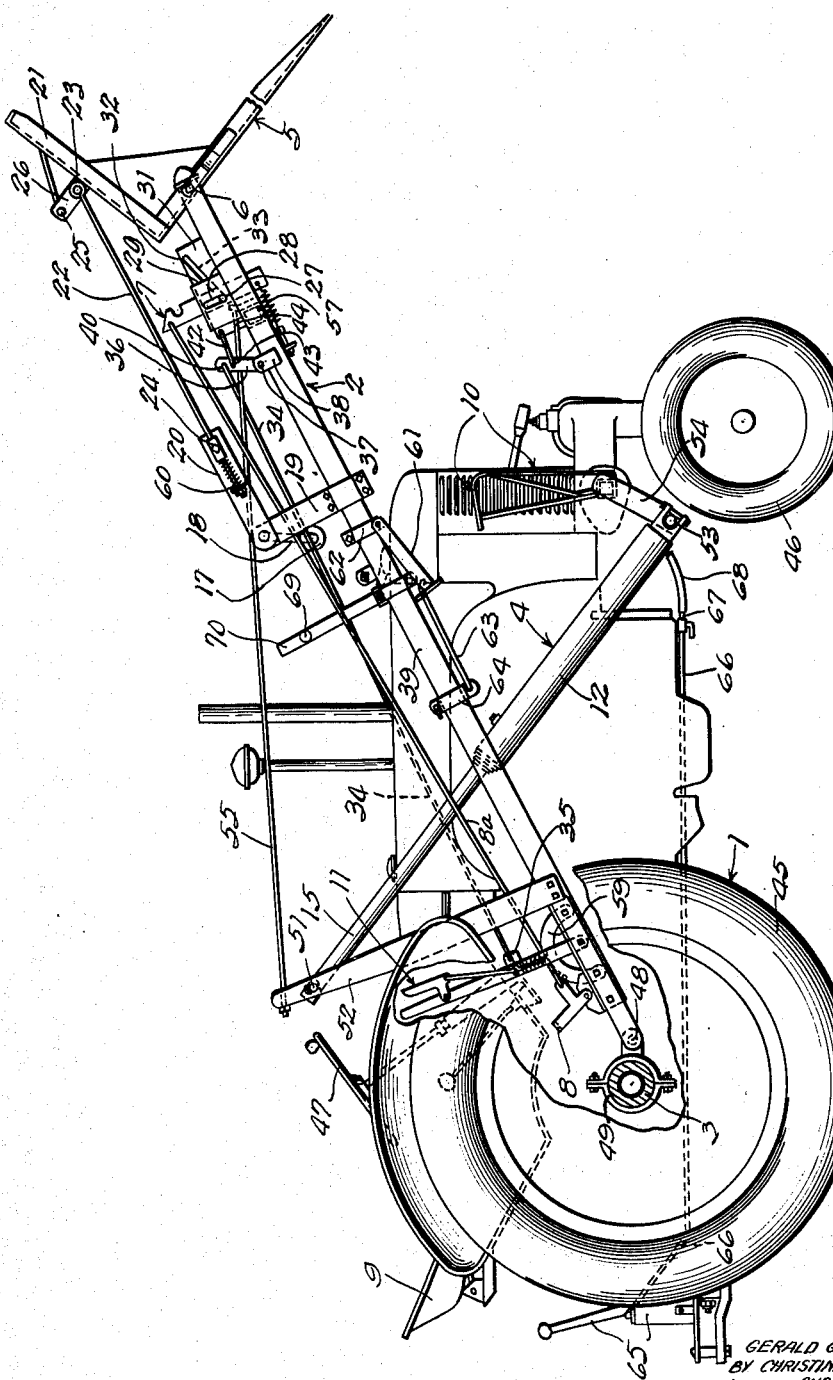

Patented Mar. 24, 1953

2,632,575

UNITED STATES PATENT OFFICE 2,632,575

TRACTOR MOUNTED LIFTER AND LOADER

Gerald Geraldson, deceased, late of Rockford, Ill., by Christina Geraldson, executrix, and John M. Markel, Rockford, Ill., assignors to J. I. Case Company, Racine, Wis., a corporation of Wisconsin Application March 23, 1948, Serial No. 16,504

4 Claims. (Cl. 214—140)

This invention relates to a tractor-mounted lifter and loader having hydraulic means for lifting the fork to the desired height.

An object of this invention is to provide a loader that can be easily attached to a tractor.

Another object of this invention is to provide a loader having a fork, the angle of which, relative to the ground, can be adjusted from the operator's position.

Another object is to provide a loader of low height as compared with the elevation to which the fork or pick-up portion may extend.

Another object is to provide a loader which may be dumped or discharged at a lower elevation than is commonly possible without interference with the re-set mechanism.

Another object is to provide for the ready mounting and dismounting of the loader with respect to a tractor.

Further objects and advantages of the invention will be apparent from the description and claims.

In the drawings, in which an embodiment of the invention is shown,

Figure 1 is a plan view of a tractor-mounted loader;

Fig. 2 is a side elevational view of the tractor and loader shown in Fig. 1, with the fork in lowered position;

Fig. 3 is a view similar to Fig. 2 with the boom and fork in raised position and the fork in discharge position;

Fig. 4 is an enlarged side elevational view showing the latch mechanism for the fork and showing the means for adjusting the angular position of the fork tines with respect to the boom;

Fig. 5 is a plan view of the construction shown in Fig. 4, and

Fig. 6 is an enlarged detail of certain mechanism indicated in Figs. 2 and 3.

Referring to the drawings in detail, the construction shown comprises a manure loader which may be mounted on an engine-driven vehicle which may be any usual or suitable tractor 1, the loader comprising a two-armed fork-supporting boom 2 straddling the vehicle and detachably and pivotally secured to the rear axle housings 3 of the tractor and extending forwardly therefrom, a pair of hydraulic rams 4 acting on the arms of the boom, respectively, for raising and lowering the boom, a fork or pick-up device 5 pivotally mounted on the swinging end of the boom at 6 movable from a load-receiving and retaining position as shown in Fig. 2 to a raised dumping position as shown in Fig. 3, a pair of latch devices 7 mounted on opposite sides of the boom for automatically latching the fork with respect to the boom in load-receiving and retaining position, a pedal 8 operable by the driver in the seat 9 for releasing the latches 7 when the boom 2 is in raised position as shown in Fig. 3 to enable the fork 5 to drop to dumping position, cam means 10 for causing the fork (as it moves from raised dumping position to lowered position) to move to load-receiving and retaining position and become latched in this position, and manually adjustable means, including the hand lever 11, for varying the angular position of the pick-up fork 5 with respect to the boom 2 and holding it in adjusted position during the movement of the boom.

In use, assuming that there is a pile of manure to be loaded, located in front of the loader in the position shown in Fig. 2 and that it is desired to pick up a forkful and carry it over to a spreader which is to be loaded, the boom 2 is brought to the desired position for insertion into the pile, for example as shown in Fig. 2, by controlling the admission or exhaust of fluid under pressure with respect to the hydraulic cylinders 12 and 13 of the two rams 4. If it is desired to take off of the top of the pile first, the fork 5 will not be brought to its completely lowered position in this pick-up operation. When the fork has been inserted to the desired distance in the pile, the hydraulic rams 4 are operated to cause the pistons 15 and 16 to be projected from the cylinders to cause the boom 2 to be raised to the desired height as shown in Fig. 3. The tractor may then be driven over in position to dump the forkful into the spreader. The operator then depresses the foot pedal 8 to release the latch members 7 and allow the fork to drop by gravity to the load-releasing position shown in Fig. 3, allowing the load to fall into the spreader. The operator then runs the tractor back toward the pile for another forkful. As the loader is traveling, the fluid pressure from the rams may be released to allow the pistons 15 to retract into the cylinders under the force due to the weight of the boom to allow the boom to move to its desired load-receiving position. As the boom moves from the position shown in Fig. 3 to the position shown in Fig. 2, a quick rise portion 16$^a$ of the cam 10 is engaged by the cam follower roller 17 which is mounted on one arm 18 of a bell crank lever rockably mounted in a bracket 19 secured to the boom arm. The other rock arm 20 of the bell crank lever is connected with the upwardly-extending rear portion 21 of the fork 5 by means of a longitudinally-yieldable link 22 having one end pivotally connected to the fork at 23 and the other end pivotally connected to the rock arm at 24. As the boom 2 in its downward movement causes the cam follower 17 to engage the cam 10, the fork 5 is caused to straighten out and align itself with the boom and finally to latch with respect to the boom by the engagement of the rollers, detents, or the like, 25 underneath the spring-pressed latches 7. The rear upright portion 21 of the fork is provided with a pair of keeper brackets 26, one pair at each side of the fork and between which the rollers 25 are mounted.

The latch members 7 are fixedly secured to a cross-shaft 27 which is slidably and rockably mounted in slots 28 in a pair of brackets 29, in the present instance of inverted U-shape, secured to the boom arms, respectively. If the rockshaft 27 is raised, the latches 7 will be raised and the tips of the fork tines or bottom portion 30 of the fork will be lowered when the fork is in latched position, and vice versa. This adjustment of the rockshaft of the latch members enables the angular position of the pivoted fork with respect to the boom arms to be varied as desired by a proper setting of the hand-operable adjusting lever 11 on the left side of the tractor. The shifting up and down of the rockshaft 27 with which the latches 7 are rockably mounted, is effected by means of a pair of slides, cams or actuators 31 slidably mounted in brackets 29 on the boom arms, respectively, each having an obliquely-extending slot 33 through which the shiftable rockshaft 27 extends. When the slides are shifted longitudinally on the boom arms, the rockshaft will be constrained to move up or down because of the cooperation between the slots 28 in the brackets and the slots 33 in the slides 31 with the rockshaft 27 which extends through these slots. The slides 31 are operated simultaneously from the control lever 11 by means of a link 34 pivotally connected with the control lever 11 at 35, a rock arm 36 secured to a rockshaft 37 mounted on brackets 38 on the boom arms 39 and pivotally connected at 40 with the link 34, a rock arm 41 mounted on the rockshaft 37, and links 42 pivotally connected at 43 with the rock arms 36 and 41, respectively, and pivotally connected at 44 with the slides 31, respectively.

As previously indicated, the tractor may be of any usual construction comprising the rear wheels 45, the front wheels 46, the steering wheel 47 and steering gear for steering the front wheels. The supporting boom 2 comprises the two arms 39, one on each side of the tractor, each arm being pivotally mounted at 48 on a split bracket 49 detachably secured to the rear axle housing 3. The end of each of the piston rods 15, 16 is pivotally secured at 51 adjacent the upper end of an upwardly-extending arm 52 rigidly secured to one of the arms 39 of the boom. The lower end of each of the cylinders 12, 13 is pivotally mounted at 53 on a bracket 54 detachably secured adjacent the lower front end of the engine, the bracket 54 being detachably secured in the usual socket in the tractor provided for the attachment of the cultivator beams or crossbars. In order to hold the upright arms 52 in proper position with respect to the boom arms 39, a pair of tension rods 55 are provided connecting the arms 52 with the crossbar 56 of the boom 2. As shown in Figs. 1, 2, and 3, the cam means 10 is mounted on a bracket secured in one of the cultivator beam sockets.

In order to hold the latches 7 in position to engage the rollers 25 on the fork when the fork is moved to latching position, a coil tension spring 57 is provided having one end secured to a bracket 58 mounted on the crossbar 56 of the boom and having its other end secured to one of the latches 7. In order to hold the fork 5 in the desired adjusted position, the lever 11 is provided with a quadrant 59 secured to a boom arm 39 and having notches for holding the lever 11 in its adjusted position. In order to provide some tolerance in the latching operation of the fork 5 and to provide a shock absorbing effect, the link 22 is made yieldingly extensible. This is accomplished by making the link 22 slidable in a guide pivotally mounted on the arm 20 at 24 and providing a coil compression spring 60 acting to draw the pivoted ends 23 and 24 of the link toward each other.

To facilitate connecting and disconnecting the boom and associated parts with the tractor, each arm of the boom is provided with a pivoted foldable foot 61 which can be lowered to rest on the ground and hold the rear end of the boom arms 39 up in the air while the tines or bottom portion 30 of the fork 5 rest on the ground, thus bringing the split connecting members 49 to a position where they can readily engage the axle housings 3. In making the connection, the feet 61 are set in lowered ground-engaging position to hold the rear ends of the boom arms 39 in elevated position, the tractor is driven from the rear in between the two elevated ends and the split brackets 49 are secured to the axle housings. Each foot is pivotally mounted on a bracket 62 detachably secured to one of the boom arms 39 and may be raised and held in raised position by a link 63 pivotally connected at one end to the pivoted foot 61 and pivotally connected at its other end to a clamping bracket 64 mounted for longitudinal adjustment on the boom arm 39. After the boom is connected to the tractor, the positioning feet 61 may be raised and held in raised position by sliding the clamping bracket 64 away from the clamping bracket 62 and clamping it with the brackets in extreme separated position as shown in Figs. 2 and 3.

The cylinders 12 and 13 may be supplied with liquid under pressure from a supply source of well-known type, provided with a control lever 65 located in a position convenient for control by the driver seated on the tractor, through a pipe 66 leading to a pair of nipples 67, one for each of the cylinders 12 and 13. The cylinders may be detachably connected with these nipples by means of flexible lengths of tubing 68 leading from the nipples to the lower end of the cylinders. When the boom is to be disconnected from the tractor, the flexible tubing is disconnected from the nipples and the free ends slipped over or threaded on suitably-shaped studs 69 mounted on brackets 70 secured to the boom arms 39. This keeps the tubing from flopping around when the boom arms are disconnected from the tractor.

The operation of the device is thought to be apparent from the foregoing, it being sufficient to say that the fork or pick-up member 5 is inserted in the material by forward movement of the tractor and raised by operation of the fluid pressure cylinders 4. If the angle of bottom portion or tines 30 is not correct it may be changed by manipulating lever 11 for shifting cams 31. When the point of discharge has been reached, the load may be dumped by pressing pedal 8 for withdrawing latches 7 from detents 25 by means of the link 8ª. Upon downward movement of pick-up or fork 5, roller 17 encounters the quick-rise portion 16ª of cam 10 and is abruptly shifted to the position shown in Figs. 2 and 6, returning pick-up portion 5 to the loading position of Fig. 2, serious shock being avoided by yielding of spring 60.

It will be observed that the quick-rise portion 16ª is located a substantial distance below the position of roller 17 when pick-up 5 is in its extreme elevated position, as shown in Fig. 3, and it follows that pick-up 5 may be released with accompanying movement of roller 17 before pick-up 5 has risen to excessive height for loading a low vehicle. This is so because the quick-rise portion of cam 10 causes the resetting of the pick-up in loading position only during the last part of the downward movement of the boom, the roller 17 being free during the remainder of the movement.

What is claimed is:

1. A material loader comprising a motor-driven vehicle, a fork-supporting boom pivotally mounted on said vehicle, means for raising and lowering said boom, a pick-up and discharge device mounted on said boom for pivotal movement from a load-receiving and retaining position to a dumping position, latch means for holding said device in load-retaining position, means for releasing said latch to enable the device to move to dumping position, and manually operable means for varying the angular load-receiving position of the device with respect to the boom and holding the device in adjusted angular position during the movement of the boom, said latch means comprising a latch member having a trunnion mounted for rocking and lateral sliding movement on said boom, and guide means on said boom for engaging and guiding said trunnion, said adjusting means comprising means for shifting laterally the position of the axis of the latch member with respect to the boom.

2. In a tractor-mounted loading device a forwardly-extending boom movable from a lowered to a raised position, a pick-up device having a bottom portion and a pivotal connection with said boom, and said pick-up device being swingable from a downwardly-directed discharge position to a loading and lifting position with said bottom portion extending generally in the direction of said boom, a detent on said pick-up device spaced longitudinally of the loading device from said pivotal connection, a latch device engaged with said detent for holding said pick-up device in said lifting and loading position and releasable from said detent to provide for swinging of said pick-up device into said discharge position, a pintle for said latch mounted for rocking and lateral sliding movement on said boom, guide means on said boom for engaging and guiding said pinion laterally, and adjusting means for shifting laterally the position of the axis of the latch member with respect to the boom comprising cam means for said pintle supporting the same from said boom and shiftable to space said pintle more or less from said boom for changing the angle of said bottom portion of said pick-up device relative to said boom.

3. A device of the character of claim 2 including mechanism for rocking said latch device about said pintle for releasing said pick-up device for swinging to dumping position.

4. In a tractor-mounted loading device a forwardly-extending boom movable from a lowered to a raised position, a pick-up device having a bottom portion and a pivotal connection with the boom, and said pick-up device being swingable from a downwardly-directed discharge position to a loading and lifting position with said bottom portion extending generally in the direction of said boom, latch and detent devices on said boom and pick-up for maintaining said pick-up in said loading and lifting position, a crank arm for shifting said pick-up device from said discharge position to said loading and lifting position, said crank arm being pivotally supported on said boom and having connections constituted to swing said pick-up in an upward direction in response to upward swinging of said crank arm, and a cam on said tractor having a quick rise portion disposed in the path taken by said crank arm during downward movement of said boom and a slow rise portion disposed in the path taken by said crank arm during upward movement of said boom, and a resilient element interposed in the connection between the crank arm and the pick-up device, so that said crank arm can be forced by said cam somewhat beyond the position necessary to cause latching of said latch and detent devices by yielding of said resilient element to insure latching of said latch and detent devices.

CHRISTINA GERALDSON,
*Executrix of the estate of Gerald Geraldson, deceased.*

JOHN M. MARKEL.

REFERENCES CITED

The following references are of record in the file of this patent:

UNITED STATES PATENTS

| Number | Name | Date |
|---|---|---|
| 2,268,689 | Andrus | Jan. 6, 1942 |
| 2,301,102 | Werthman et al. | Nov. 3, 1942 |
| 2,319,921 | Dooley et al. | May 25, 1943 |
| 2,387,687 | Smith | Oct. 23, 1945 |
| 2,393,435 | Wachter | Jan. 22, 1946 |
| 2,398,964 | Rogers et al. | Apr. 23, 1946 |
| 2,402,064 | Markel | June 11, 1946 |
| 2,417,560 | McNamara, Jr. | Mar. 18, 1947 |
| 2,451,101 | Leschinsky | Oct. 12, 1948 |
| 2,462,790 | Van Voorhis | Feb. 22, 1949 |
| 2,469,007 | Siebring | May 3, 1949 |